US 9,645,706 B2

United States Patent
Millett et al.

(10) Patent No.: US 9,645,706 B2
(45) Date of Patent: May 9, 2017

(54) GENERATING AND IMPLEMENTING LOCALIZED JUMP LISTS

(71) Applicant: Microsoft Technology Licensing, LLC, Redmond, WA (US)

(72) Inventors: Thomas W. Millett, Mill Creek, WA (US); Haroon Dawood Barri, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 270 days.

(21) Appl. No.: 13/890,859

(22) Filed: May 9, 2013

(65) Prior Publication Data

US 2014/0282042 A1     Sep. 18, 2014

Related U.S. Application Data

(60) Provisional application No. 61/783,564, filed on Mar. 14, 2013.

(51) Int. Cl.
    *G06F 3/0482*     (2013.01)
    *G06F 17/30*     (2006.01)
    (Continued)

(52) U.S. Cl.
    CPC .... *G06F 3/0482* (2013.01); *H04M 1/274525* (2013.01); *H04M 1/274558* (2013.01);
    (Continued)

(58) Field of Classification Search
    CPC .................. G06F 3/0481; G06F 3/0482; G06F 17/30988; G06F 17/30401;
    (Continued)

(56) References Cited

U.S. PATENT DOCUMENTS 5,148,541 A *    9/1992   Lee et al.
6,392,640 B1       5/2002   Will
           (Continued)

FOREIGN PATENT DOCUMENTS

CN       101568088      10/2009
CN       102281345      12/2011
              (Continued)

OTHER PUBLICATIONS

"International Search Report & Written Opinion for PCT Patent Application No. PCT/US2014/023688", Mailed Date: Jun. 27, 2014, Filed Date: Mar. 11, 2014, 10 Pages.

(Continued)

*Primary Examiner* — Ajay Bhatia
*Assistant Examiner* — Mong-Shune Chung
(74) *Attorney, Agent, or Firm* — Workman Nydegger (57) ABSTRACT

Embodiments are directed to implementing localized jump lists and to generating a locale-specific jump list. In one scenario, a computer system sends a synchronization request to receive a current contact list that includes a user's contacts. The computer system receives both a synchronized contact list and a locale-specific jump list, which includes jump header sort keys that indicate the relative sorting position of each jump header. The computer system receives a user input indicating that the user has selected a specified jump header and intends to jump to a specified point in the contact list. The computer system then jumps to the user-specified point in the contact list using the jump header sort key that corresponds to the selected jump header in the locale-specific jump list and displays the contact list to the user at the selected jump header that was jumped to using the jump header sort key.

16 Claims, 4 Drawing Sheets

(51) Int. Cl.
  *G06F 3/0481* (2013.01)
  *H04L 12/58* (2006.01)
  *H04M 1/2745* (2006.01)
  *H04M 1/725* (2006.01)

(52) U.S. Cl.
  CPC ..... *H04M 1/274583* (2013.01); *G06F 3/0481* (2013.01); *G06F 17/3087* (2013.01); *G06F 17/30401* (2013.01); *G06F 17/30952* (2013.01); *G06F 17/30988* (2013.01); *H04L 51/04* (2013.01); *H04M 1/274516* (2013.01); *H04M 1/72572* (2013.01); *H04M 2250/58* (2013.01); *Y10S 707/99937* (2013.01)

(58) Field of Classification Search
  CPC ........... G06F 17/30952; G06F 17/3087; Y10S 707/99937; H04L 51/04
  USPC ................ 715/739, 744, 700; 455/456.3
  See application file for complete search history.

(56) References Cited

U.S. PATENT DOCUMENTS

| | | | |
|---|---|---|---|
| 2008/0168348 A1* | 7/2008 | Bergstrom | H04L 51/04 715/700 |
| 2010/0298034 A1 | 11/2010 | Shin et al. | |
| 2011/0092227 A1* | 4/2011 | Phukan | G06F 17/3087 455/456.3 |
| 2012/0102036 A1 | 4/2012 | Parker et al. | |
| 2014/0149878 A1* | 5/2014 | Mischari et al. | 715/739 |

FOREIGN PATENT DOCUMENTS

| | | |
|---|---|---|
| CN | 102447740 | 5/2012 |
| DE | 19909941 A1 | 3/2000 |
| EP | 2234378 A1 | 9/2010 |

OTHER PUBLICATIONS

Shaham, Elad, "Windows Phone Jump List Contact Chooser Control", Published on: Oct. 10, 2011, Available at: http://blogs.microsoft.co.il/blogs/eshaham/archive/2011/10/10/windows-phone-jump-list-contact-chooser-control.aspx.
Jairo, "How to Bind JumpList to Windows Phone Contacts?", Published on: Jul. 21, 2012, Available at: http://www.telerik.com/community/forums/windows-phone/jumplist/how-to-bind-jumplist-to-windows-phone-contacts.aspx.
"Sync Contacts with your iOS Device", Published on: Apr. 26, 2013, Available at: https://support.google.com/mail/answer/2753077?hl=en.
Kenyon, John, "Searching Contacts", Published on: Aug. 10, 2007, Available at: http://wiki.civicrm.org/confluence/display/CRMDOC40/Searching+Contacts.
"Synker—The Sync Widget", Published on: Feb. 18, 2012, Available at: https://play.google.com/store/apps/details?id=com.afterhoursdevelopers.android.synker&hl=en.
Lofte, Leanna, "Buzz Contacts Offers Quick Access to Your Contacts that Matter Most", Published on: Feb. 22, 2012, Available at: http://www.imore.com/buzz-contacts.
Chinese Office Action issued in China application #201480014920.7 mailed Mar. 6, 2017.

* cited by examiner

| Name | Jump Header Display | Jump Header Sort Key | |
|---|---|---|---|
| | | | ~ 124 |
| Alice | A | 4,106,143 | |
| Bob | B | 4,106,144 | |
| ⋮ | ⋮ | ⋮ | |

401 — Name
106 — Jump Header Display

*Figure 4B*

GENERATING AND IMPLEMENTING LOCALIZED JUMP LISTS

CROSS-REFERENCE TO RELATED APPLICATIONS

This application claims priority to and the benefit of U.S. Provisional Application Ser. No. 61/783,564, filed on Mar. 14, 2013, entitled "Generating and Implementing Localized Jump Lists", which application is incorporated by reference herein in its entirety.

BACKGROUND

Computers have become highly integrated in the workforce, in the home, in mobile devices, and many other places. Computers can process massive amounts of information quickly and efficiently. Software applications designed to run on computer systems allow users to perform a wide variety of functions including business applications, schoolwork, entertainment and more. Software applications are often designed to perform specific tasks, such as word processor applications for drafting documents, or email programs for sending, receiving and organizing email.

Personal information management programs provide access to a user's contacts, emails, calendar and other items. When accessing contacts, a user may want to jump to a specific first or last name. In cases where the user has many contacts, the personal information management application will often provide jump headers. These are usually letters that, when selected, jump the user down the list to the selected letter. For instance, if the user wanted to search for a contact with the last name "Wyatt", the user could select the "W" character in the jump headers, and the contact list would jump to contacts having last names starting with "W".

BRIEF SUMMARY

Embodiments described herein are directed to implementing localized jump lists and to generating a locale-specific jump list. In one embodiment, a computer system sends a synchronization request to receive a current contact list that includes a user's contacts. The synchronization request further includes locale information for the user. The computer system receives both a synchronized contact list that includes the user's contacts and a locale-specific jump list. The locale-specific jump list includes jump header sort keys that indicate the relative sorting position of each jump header. The computer system also receives a user input from the user indicating that the user has selected a specified jump header and intends to jump to a specified point in the contact list. The computer system maps the user-specified jump header into its corresponding locale-specific jump header sort key. The computer system then jumps to the location of that sort key in the user's contact list, and displays the contacts from that point onward.

In another embodiment, a computer system is used to generate a locale-specific jump list. The computer system receives, from a client computing system user, a synchronization request that requests a contact list with the user's contacts. The synchronization request itself also includes locale information for the user. The computer system then generates a current contact list and locale-specific jump list. The locale-specific jump list includes jump header sort keys that indicate the relative sorting position of each jump header. The computer system sends the generated contact list and locale-specific jump list to the client computing system. Then, upon receiving user input indicating that the user has selected a specified jump header and intends to jump to a specified point in the contact list, the contact list will jump to the user-specified point using the jump header sort key that corresponds to the selected jump header in the locale-specific jump list.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be apparent to one of ordinary skill in the art from the description, or may be learned by the practice of the teachings herein. Features and advantages of embodiments described herein may be realized and obtained by means of the instruments and combinations particularly pointed out in the appended claims. Features of the embodiments described herein will become more fully apparent from the following description and appended claims.

BRIEF DESCRIPTION OF THE DRAWINGS

To further clarify the above and other features of the embodiments described herein, a more particular description will be rendered by reference to the appended drawings. It is appreciated that these drawings depict only examples of the embodiments described herein and are therefore not to be considered limiting of its scope. The embodiments will be described and explained with additional specificity and detail through the use of the accompanying drawings in which.

DETAILED DESCRIPTION

Embodiments described herein are directed to implementing localized jump lists and to generating a locale-specific jump list. In one embodiment, a computer system sends a synchronization request to receive a current contact list that includes a user's contacts. The synchronization request further includes locale information for the user. The computer system receives both a synchronized contact list that includes the user's contacts and a locale-specific jump list. The locale-specific jump list includes jump header sort keys that indicate the relative sorting position of each jump header. The computer system also receives a user input from the user indicating that the user has selected a specified jump header and intends to jump to a specified point in the contact list. The computer system maps the user-specified jump header into its corresponding locale-specific jump header sort key. The computer system then jumps to the location of that sort key in the user's contact list, and displays the contacts from that point onward.

In another embodiment, a computer system is used to generate a locale-specific jump list. The computer system receives, from a client computing system user, a synchronization request that requests a contact list with the user's contacts. The synchronization request itself also includes locale information for the user. The computer system then generates a current contact list and locale-specific jump list. The locale-specific jump list includes jump header sort keys that indicate the relative sorting position of each jump header. The computer system sends the generated contact list and locale-specific jump list to the client computing system. Then, upon receiving user input indicating that the user has selected a specified jump header and intends to jump to a specified point in the contact list, the contact list will jump to the user-specified point using the jump header sort key that corresponds to the selected jump header in the locale-specific jump list.

The following discussion now refers to a number of methods and method acts that may be performed. It should be noted, that although the method acts may be discussed in a certain order or illustrated in a flow chart as occurring in a particular order, no particular ordering is necessarily required unless specifically stated, or required because an act is dependent on another act being completed prior to the act being performed.

Embodiments described herein may comprise or utilize a special purpose or general-purpose computer including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general purpose or special purpose computer system. Computer-readable media that store computer-executable instructions in the form of data are computer storage media. Computer-readable media that carry computer-executable instructions are transmission media. Thus, by way of example, and not limitation, embodiments described herein can comprise at least two distinctly different kinds of computer-readable media: computer storage media and transmission media.

Computer storage media includes RAM, ROM, EEPROM, CD-ROM, solid state drives (SSDs) that are based on RAM, Flash memory, phase-change memory (PCM), or other types of memory, or other optical disk storage, magnetic disk storage or other magnetic storage devices, or any other medium which can be used to store desired program code means in the form of computer-executable instructions, data or data structures and which can be accessed by a general purpose or special purpose computer.

A "network" is defined as one or more data links and/or data switches that enable the transport of electronic data between computer systems and/or modules and/or other electronic devices. When information is transferred or provided over a network (either hardwired, wireless, or a combination of hardwired or wireless) to a computer, the computer properly views the connection as a transmission medium. Transmission media can include a network which can be used to carry data or desired program code means in the form of computer-executable instructions or in the form of data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a network interface card or "NIC"), and then eventually transferred to computer system RAM and/or to less volatile computer storage media at a computer system. Thus, it should be understood that computer storage media can be included in computer system components that also (or even primarily) utilize transmission media.

Computer-executable (or computer-interpretable) instructions comprise, for example, instructions which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that various embodiments may be practiced in network computing environments with many types of computer system configurations, including personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. Embodiments described herein may also be practiced in distributed system environments where local and remote computer systems that are linked (either by hardwired data links, wireless data links, or by a combination of hardwired and wireless data links) through a network, each perform tasks (e.g. cloud computing, cloud services and the like). In a distributed system environment, program modules may be located in both local and remote memory storage devices.

In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

For instance, cloud computing is currently employed in the marketplace so as to offer ubiquitous and convenient on-demand access to the shared pool of configurable computing resources. Furthermore, the shared pool of configurable computing resources can be rapidly provisioned via virtualization and released with low management effort or service provider interaction, and then scaled accordingly.

A cloud computing model can be composed of various characteristics such as on-demand self-service, broad network access, resource pooling, rapid elasticity, measured service, and so forth. A cloud computing model may also come in the form of various service models such as, for example, Software as a Service ("SaaS"), Platform as a Service ("PaaS"), and Infrastructure as a Service ("IaaS"). The cloud computing model may also be deployed using different deployment models such as private cloud, community cloud, public cloud, hybrid cloud, and so forth. In this description and in the claims, a "cloud computing environment" is an environment in which cloud computing is employed.

Additionally or alternatively, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), and other types of programmable hardware.

Still further, system architectures described herein can include a plurality of independent components that each contribute to the functionality of the system as a whole. This modularity allows for increased flexibility when approaching issues of platform scalability and, to this end, provides a variety of advantages. System complexity and growth can be managed more easily through the use of smaller-scale parts with limited functional scope. Platform fault tolerance is enhanced through the use of these loosely coupled modules. Individual components can be grown incrementally as business needs dictate. Modular development also translates to decreased time to market for new functionality. New functionality can be added or subtracted without impacting the core system.

Figure 1:
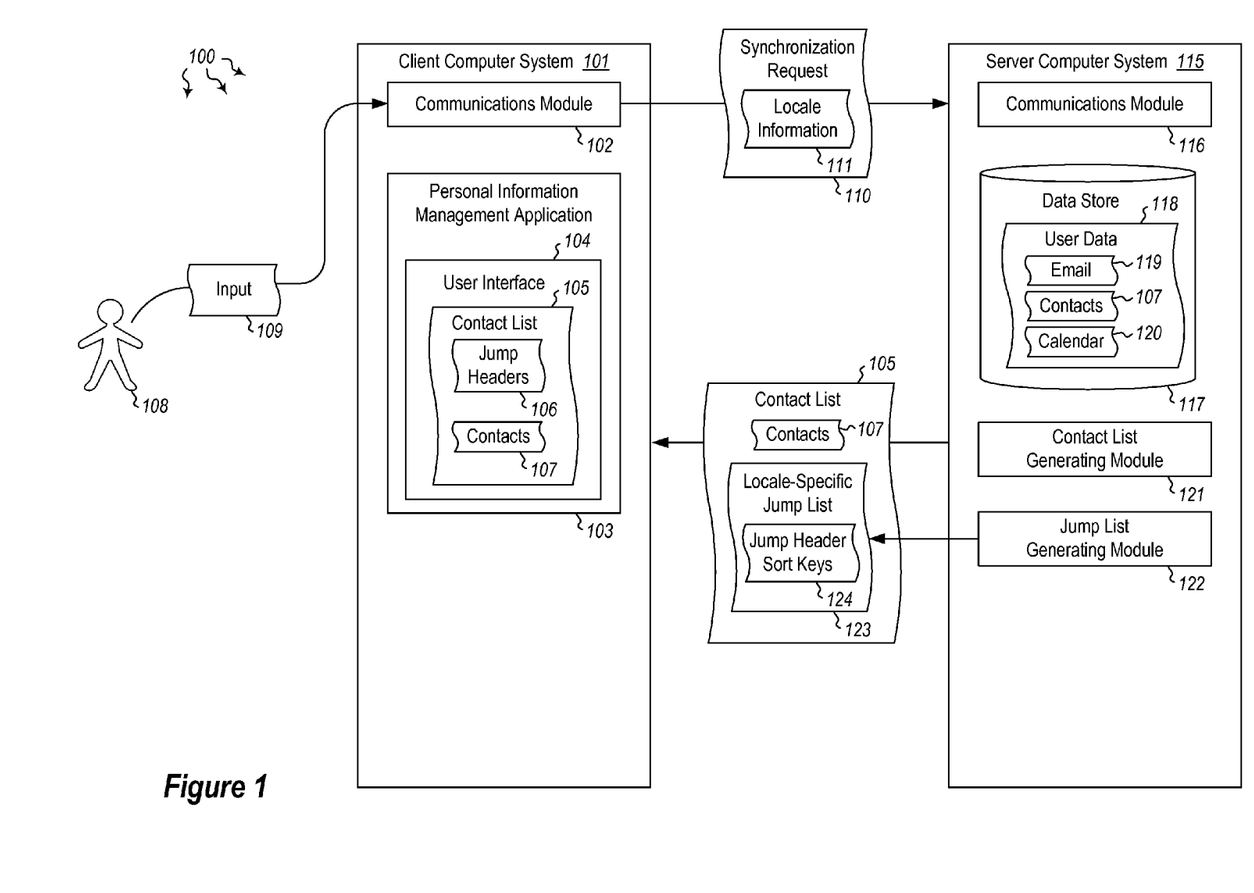
FIG. 1 illustrates a computer architecture in which embodiments described herein may operate including implementing localized jump lists.

FIG. 1 illustrates a computer architecture 100 in which at least one embodiment may be employed. Computer architecture 100 includes client computer system 101 and server computer system 115. Either client computer system 101 or server computer system 115 may be any type of local or distributed computer system, including a cloud computing system. Both the client and server computer systems include modules for performing a variety of different functions. For instance, both the client and server computer systems include communications modules (102 and 116, respectively). The communications modules allow the computing systems to communicate with other modules and/or other computing systems via wired or wireless network or other connections. The client computer system 101 further includes a personal information management application 103. The personal information management application 103 provides access to a user's email, contacts, calendar and other functionality. Thus, for example, user 108 may be able to interact with the personal information management application 103 (using input 109) to read email, find contacts and check appointments.

The personal information management application 103 includes a user interface (UI) 104 that facilitates interaction. The UI may be designed for touchscreen interaction (such as on a smartphone or tablet), or may be designed for more traditional mouse and keyboard interaction. As mentioned above, the UI allows users to interact with their contacts, among other things. The contacts may be sorted according to first name, last name or other criteria in contact list 105. In some cases, the user may want to jump to a certain contact or contacts. For instance, if the contacts are initially displayed in the UI in alphabetical order, with user's last names beginning with A first, and the user wishes to view last names starting with "L", the user may jump to the users with last names starting with "L" using a jump header 106. These jump headers are locale-specific.

When the user requests a current contact list from the server 115, the client computer system 101 may send synchronization request 110. This synchronization request may indicate that the user's email 119, contacts 107, calendar 120 and/or other user information 118 are to be synchronized to the user's mobile or other device (i.e. client computer system 101). The synchronization request may include locale information 111 identifying the user's selected language and/or country of origin. The contact list generating module 121 may access the user's data 118 in the data store 117 (which itself may be local or distributed) to create the contact list 105. The contact list may be sent, along with a locale-specific jump list created by the jump list generating module 122. The locale-specific jump list is a jump list that is specific to the user's locale and language (as indicated by locale information 111). The locale-specific jump list includes jump header sort keys that identify how certain characters (e.g. "fi" or "ö") are to be sorted for that language. Each contact is thus associated with a jump header sort key that specifies how the jump headers 106 are to be displayed and implemented in the contact list 105 in the personal information management application's UI 104. These concepts will be explained further below with regard to methods 200 and 300 of FIGS. 2 and 3, respectively.

Figure 2:
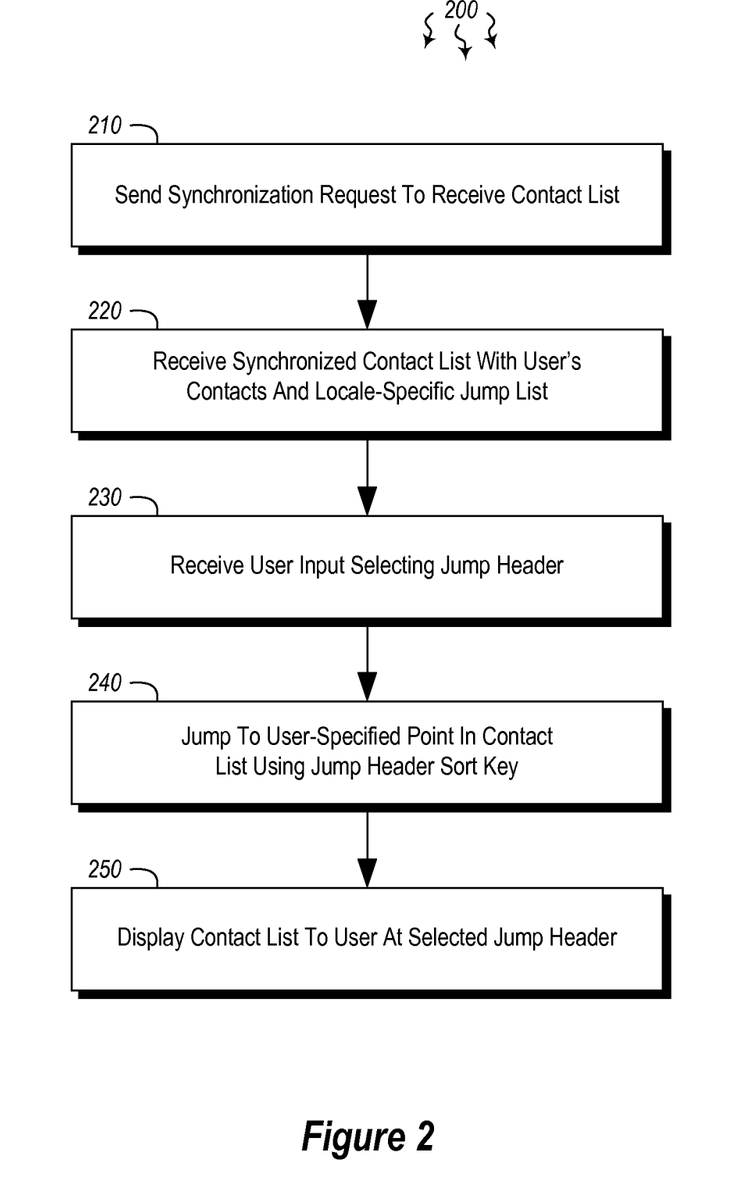
FIG. 2 illustrates a flowchart of an example method for implementing localized jump lists.
Figure 3:
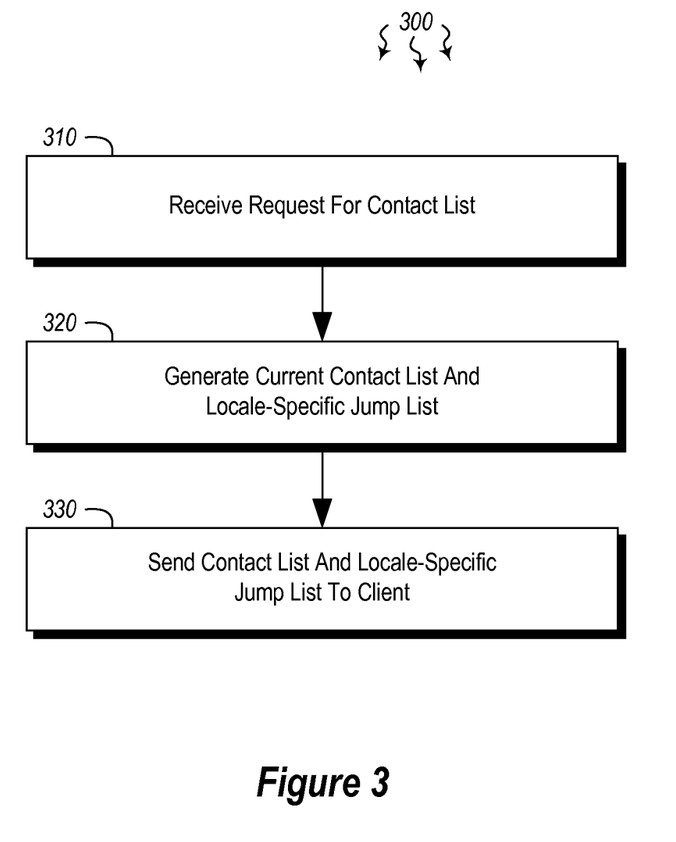
FIG. 3 illustrates a flowchart of an example method for generating a locale-specific jump list.

In view of the systems and architectures described above, methodologies that may be implemented in accordance with the disclosed subject matter will be better appreciated with reference to the flow charts of FIGS. 2 and 3. For purposes of simplicity of explanation, the methodologies are shown and described as a series of blocks. However, it should be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter.

FIG. 2 illustrates a flowchart of a method 200 for implementing localized jump lists. The method 200 will now be described with frequent reference to the components and data of environment 100, as well as FIGS. 4A and 4B.

Method 200 includes an act of sending a synchronization request to receive a user's contact list. The synchronization request also includes locale information for the user (act 210). Next, method 200 includes an act of receiving both a synchronized contact list that includes the user's contacts and a locale-specific jump list, the locale-specific jump list including one or more jump header sort keys that indicate the relative sorting position of each jump header (act 220). Method 200 further includes an act of receiving a user input from the user indicating that the user has selected a specified jump header and intends to jump to a specified point in the contact list (act 230), an act of jumping to the user-specified point in the contact list using the jump header sort key that corresponds to the selected jump header in the locale-specific jump list (act 240), and an act of displaying the contact list to the user at the selected jump header that was jumped to using the jump header sort key of the locale-specific jump list (act 250).

In some cases, the received synchronized contact list is displayed in a user interface 104 for a personal information management application 103. The user interface 104 displays one or more selectable jump header buttons that, when selected, trigger the locale-specific jump list. The received synchronized contact list 105 may include at least one field for each contact 107 indicating which jump header sort key 124 that contact is to be listed under. For example, if the locale-specific jump list 123 has a tuple {T, 4532}, then the name Tom would have a field called "jump header sort key" with the value of 4532. Furthermore, each of the user's contacts may have a display-name sort key that sorts appropriately relative to the jump header. For example, the name Tom might have a display-name sort key value of 4535. As 4535 is a numerically larger number than 4532, "Tom" would display after "T" in the sorted list. This, in turn, is appropriate in the US-English locale, because the name "Tom" sorts after the letter "T". Further examples will be provided below.

Figure 4A:
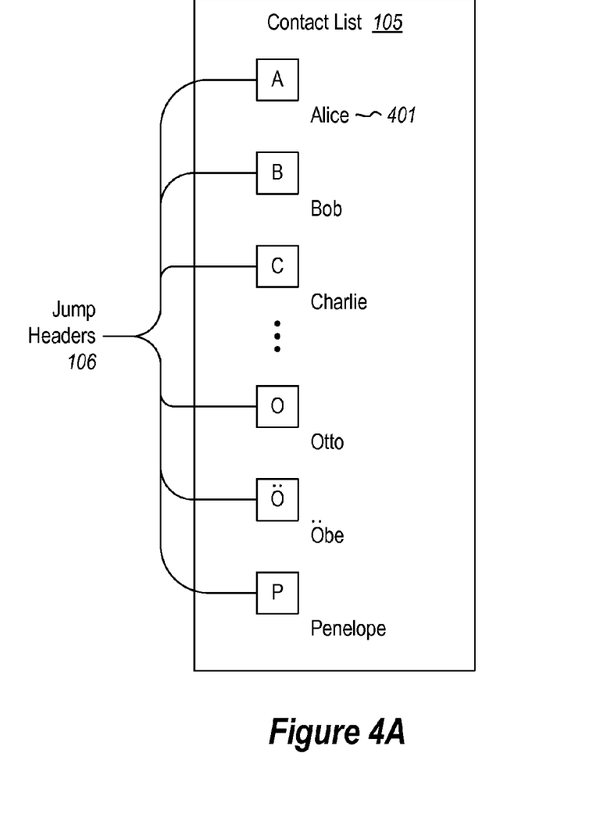
FIG. 4A illustrates an embodiment of a contact list including contacts and jump headers.
Figure 4B:
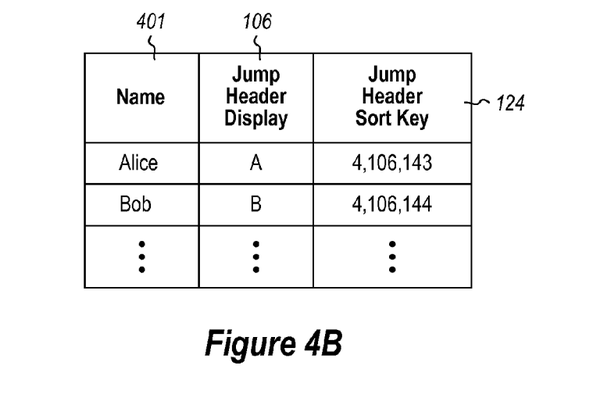
FIG. 4B illustrates an embodiment of a table including columns with contact names, jump header displays and jump header sort keys.

The contact list 105 may include substantially any number of contacts for user 108. The contacts may include a variety of different letters and characters, including letters and characters that are native to the user's language (as specified by their locale information 111). For instance, as shown in FIG. 4A, the contact list 105 may include jump headers 106, which in this embodiment are A, B, C, O, Ö, and P. The contact list 105 includes other jump headers which are not shown, and which are represented by the ellipses. The characters A, B and C may be sorted according to traditional (e.g. Unicode) sorting rules for the English alphabet. However, if the user's language is other than English, other letters and characters may be present. For example, the user 108 may have a contact named Öbe. The "Ö" character in that user's language may sort after "O" and before "P". The jump list generating module 122 of the server computer system 115 would thus generate a locale-specific jump list with jump header sort keys that would sort any names starting with "Ö" between names starting with "O" and "P". The jump headers would also be sorted according to the rules for the user's language. The user would then be able to sort their contacts according to sorting rules that apply to their language.

As shown in FIG. 4A, a variable number of jump headers may be shown. For instance, in cases where the client computer system 102 is a mobile telephone, fewer jump headers may be shown, whereas in cases where the client computer system is a tablet or laptop computer system, more jump headers may be shown. When the jump header is selected, the contact list jumps or scrolls automatically to the location in the jump list headed by the jump header. The jump headers may be arranged according to the jump header sort keys 124. These sort keys may be generated as a function of an input name (e.g. Alice) and the user's given language. The jump header sort key column in FIG. 4B may thus indicate the proper order for sorting the user's contacts in the user's language.

As mentioned above, the user interface 104 that displays the user's contacts and the jump headers 106 may be part of a personal information management application 103. The personal information management application 103 may allow the user 108 to view their user data 118 including email 119, contacts 107 and calendar information 120 (including meetings, appointments, reminders, etc.). The personal information management application may be running on a mobile computing device, and may be configured to run in offline mode, where the application still provides at least limited functionality when the application is not in communication with the server computer system 115. As will be explained further below with regard to FIG. 3, the locale-specific jump list 123 may be dynamically generated at the server computer system 115. This may be the same (or different from) the server to which the mobile computing device is communicatively connected.

After the contact list 105 and locale-specific jump list 123 have been received at the mobile computing device (e.g. client computer system 101), the mobile device may receive user input indicating that the user 108 has selected a specified jump header (e.g. "O") and intends to jump to a specified point in the contact list 105. The user input may include, for example, a touch input received in the user interface of the personal information management application running on the mobile device. Other inputs including mouse, keyboard, hand gestures or other types of input may also be used. Once the input has been received, the contact list jumps to the desired location, according to the relative sorting position determined for each jump header. The user's contacts are then displayed according to jump header sort keys 124 of the locale-specific jump list.

FIG. 3 illustrates a flowchart of a method 300 for generating a locale-specific jump list. The method 300 will now be described with frequent reference to the components and data of environment 100, as well as FIGS. 4A and 4B.

Method 300 includes an act of receiving, from a client computing system user, a synchronization request that requests a contact list with the user's contacts, where the synchronization request further includes locale information for the user (act 310). Method 300 further includes an act of generating a current contact list and locale-specific jump list, the locale-specific jump list including one or more jump header sort keys that indicate the relative sorting position of each jump header (act 320). Method 300 next includes an act of sending the generated contact list and locale-specific jump list to the client computing system, such that upon receiving user input indicating that the user has selected a specified jump header and intends to jump to a specified point in the contact list, the contact list will jump to the user-specified point using the jump header sort key that corresponds to the selected jump header in the locale-specific jump list (act 330).

As mentioned above, the locale information for the user 108 specifies the user's language. The user's contacts are to be sorted according to sorting rules specific to that language. The server computer system 115 thus creates jump header sort keys for each contact name 401. The jump header sort keys may be used to sort all of the user's contacts according to the sort order rules for the user's language. If the user wants to add new contacts, and have those contacts sorted, the user can send an indication to the server 115 indicating that one or more new contacts are to be added to the user's contact list 105. These new contacts are then added to the user's contact list, and the locale-specific jump list is updated to include one or more new jump headers and/or new jump header sort keys for the new contacts. The updated contact list 105 with updated jump list 123 and jump header sort keys 124 may be sent to the client computer system 101 whenever the client and server are communicatively connected.

The updated contact list 105 may be sent to the client computer system in response to an information update request. For instance, a personal information management application running on the client computing system 101 may send a request for a user data update. The request may include a request for updated email data, an updated contact list, and/or updated calendar information. The server computer system 115 may process the user's request, and send the updated email and calendar information along with the updated contact list 105. In this manner, the user 108 may ensure that their user data 118 is up-to-date on their mobile device (i.e. on the personal information management application on the mobile device), and that their contacts are sortable using sort rules specific to their language.

Accordingly, methods, systems and computer program products are provided which generate and implement localized jump lists. These localized jump lists allow users to jump to selected locations within their contact list, with respect to the locale or language being used.

The concepts and features described herein may be embodied in other specific forms without departing from their spirit or descriptive characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

We claim:

1. A computer system comprising:
one or more processors;
system memory;
one or more computer-readable storage media having stored thereon computer-executable instructions that, when executed by the one or more processors, causes the computing system to perform a computer-implemented method for generating a jump list that is customized based on a user's locale information, the computer-implemented method comprising:
receiving, from a client computing system, a request that requests a current contact list with a user's contacts, the request including locale information for the user, the locale information identifying a location and a language associated with the location;
in response to the request, generating the current contact list and a locale-specific jump list,
each contact entry in the current contact list having a display sort key that allows the current contact list to be sorted according to sorting rules specific for the location and the language,
the locale-specific jump list including a plurality of jump headers customized for the locale information, the customized jump headers providing access to corresponding portions of the current contact list using the jump headers as customized for the locale information, and
the locale-specific jump list also including a plurality of jump header sort keys, each jump header sort key corresponding to one of the customized jump headers, the jump header sort keys indicating a sort order for the jump headers, and the jump header sort keys corresponding to contact list entries in the current contact list in accordance with the associated display sort keys; and
sending the generated current contact list and locale-specific jump list to the client computing system, such that, when user input indicating that the user has selected a specified jump header is received at the client computing system, the contact list will jump to a user-specified point using the jump header sort key that corresponds to the selected jump header in the locale-specific jump list.

2. The computer system of claim 1, further comprising:
receiving, from the client computing system, an indication that one or more new contacts are to be added to the user's contact list; and
in response to receiving the indication to add the one or more new contacts:
adding the one or more new contacts to the user's contact list; and
updating the locale-specific jump list to include one or more new jump headers for the new contacts.

3. The computer system of claim 2, wherein the new jump headers include updated sort keys.

4. The computer system of claim 3, wherein the updated sort keys are sent with the generated contact list and the locale-specific jump list.

5. The computer system of claim 1, wherein the request is received from a personal information management application running on the client computing system.

6. The computer system of claim 5, wherein the generated updated contact list further includes one or more information updates for the personal information management application.

7. The computer system of claim 6, wherein the information updates for the personal information management application include at least one of email updates, calendar updates and/or contact updates.

8. A computer system comprising
one or more processors;
one or more computer-readable media having stored thereon computer-executable instructions that, when executed by the one or more processors, causes the one or more processors to control a system architecture configured for performing a computer-implemented method for generating a jump list that is customized based on a user's locale information, the system architecture comprising:
a data store containing user data for one or more users, the user data including a contact list for the one or more users;
a communication module which receives and sends communications from and to one or more user computing systems;
a contact list generating module which generates a current contact list for synchronizing a particular user's contact list in response to a request received from the particular user, the request including locale information identifying a location for the particular user and a language associated with the location,
each contact entry in the current contact list having a display sort key that allows the current contact list to be sorted according to sorting rules specific for the indicated location; and
a jump list generating module configured to generate, in response to the request, a locale-specific jump list for the generated current contact list,
the locale-specific jump list including a plurality of jump headers customized for the locale information in the request, the customized jump headers providing access to corresponding portions of the current contact list using the jump headers based on information relevant to the location and the language associated with the location, and
the locale-specific jump list also including a plurality of jump header sort keys, each jump header sort key corresponding to one of the customized jump headers, the jump header sort keys indicating a sort order for the jump headers, and the jump header sort keys corresponding to contact list entries in accordance with the associated display sort keys.

9. A computer-implemented method for generating a jump list that is customized based on a user's locale information, the computer-implemented method being performed by one or more processors executing computer-executable instructions for the computer-implemented method, the method comprising:
receiving, from a client computing system, a request for a current contact list that includes a user's contacts, the request including locale information for the user, the locale information identifying a location and a language associated with the location;

in response to receiving the request, generating the current contact list and generating a locale-specific jump list for the current contact list, each contact entry in the current contact list having a display sort key that allows the current contact list to be sorted according to sorting rules specific for the location and the language, the locale-specific jump list comprising a plurality of jump headers customized for the locale information in the request, the customized jump headers providing access to corresponding portions of the current contact list using the jump headers based on information relevant to the location and the language associated with the location, and the locale-specific jump list also comprising a plurality of jump header sort keys each jump header sort key corresponding to one of the customized jump headers, the jump header sort keys indicating a sort order for the jump headers, and the jump header sort keys corresponding to contact list entries in the current contact list in accordance with display-name values assigned to each sort key; and sending the current contact list and locale-specific jump list to the client computing system such that a particular point in the current contact list may be jumped to in response to selecting a particular jump header in the locale-specific jump list.

10. The computer-implemented method of claim 9, further comprising synchronizing a user's previous contact list with the current contact list, including the locale specific jump list prepared for the current contact list.

11. The computer-implemented method of claim 10, further comprising:

displaying the synchronized contact list in a user interface, wherein the user interface displays one or more selectable jump header buttons that, when selected, trigger the locale-specific jump list.

12. The computer-implemented method of claim 11, wherein the user interface is part of a personal information management application.

13. The computer-implemented method of claim 12, wherein the personal information management application is running on a mobile computing device.

14. The computer-implemented method of claim 10, wherein the synchronized contact list includes at least one field for each contact indicating which jump header sort key that contact is to be listed under.

15. The computer-implemented method of claim 10, wherein each of the user's contacts in the synchronized contact list has a display-name sort key that sorts appropriately relative to the jump header.

16. The computer-implemented method of claim 10, further comprising jumping to a user-specified point in the synchronized contact list by automatically scrolling to a selected jump header.

* * * * *